Feb. 7, 1933.  W. GUMPRICH  1,897,027

SCALE ATTACHMENT

Filed Feb. 1, 1932

INVENTOR-
William Gumprich
BY
W. M. Wilson
ATTORNEY-

Patented Feb. 7, 1933

1,897,027

UNITED STATES PATENT OFFICE

WILLIAM GUMPRICH, OF BROOKLYN, NEW YORK, ASSIGNOR TO INTERNATIONAL SCALE COMPANY, OF DAYTON, OHIO, A CORPORATION OF DELAWARE

SCALE ATTACHMENT

Application filed February 1, 1932. Serial No. 590,142.

This case relates to an attachment for weighing scales adapted to match sporting goods such as golf sticks.

The object of the invention is to provide an improved support on a scale for carrying golf sticks or the like in definitely located positions to obtain their relative distributions of gravity.

Further, the object is to combine the support with the lever of an automatic indicating and counterbalancing scale.

Various other objects and advantages of my invention will be obvious from the following particular description of one form of mechanism embodying the invention or from an inspection of the accompanying drawing and the invention also constitutes certain new and novel features of the construction and combination of parts hereinafter set forth and claimed.

Figure 1:
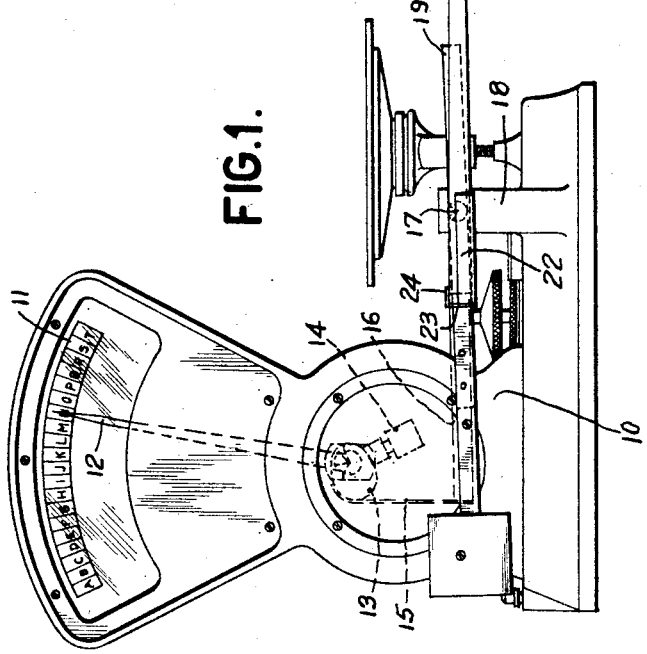
Fig. 1 is an elevation of the scale with the matching attachment.
Figure 2:
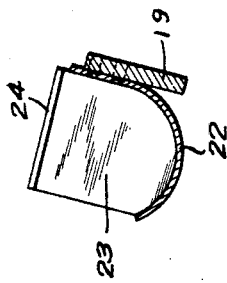
Fig. 2 is a section through the holder.
Figure 3:
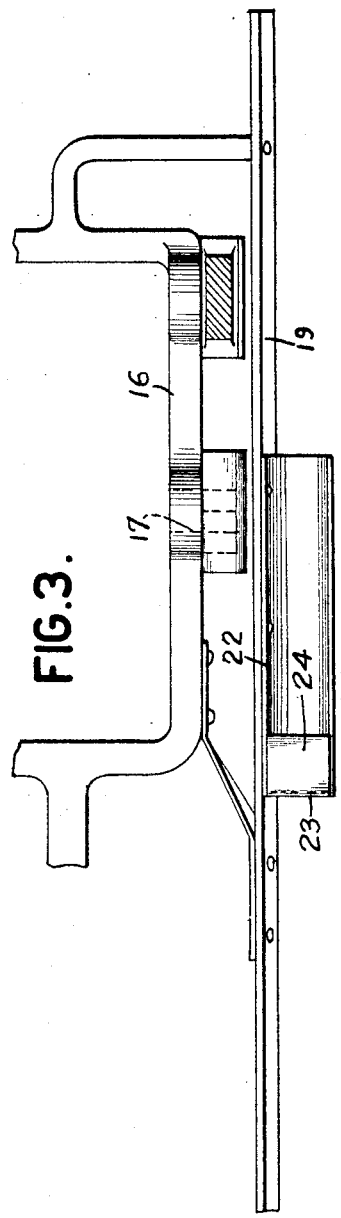
Fig. 3 is a top view of the golf stick holder or attachment and the base lever.

The scale to which the invention is shown as applied is of the fan type, comprising a housing 10 at the upper end of which is supported the chart 11 coacting with pointer 12. The pointer is carried by the power sector 13 to which is attached the pendulum 14. The power sector is connected by a tape 15 to the base lever 16 which is fulcrumed at 17 on the base standards 18. The lever carries at one side a flat bar 19. Secured to the outer side of bar 19, as by riveting, welding, or screws, is a sheet metal member 22 which is formed trough shaped or concave to accommodate round objects.

At the left hand end (as viewed in Fig. 1) the member 22 is integrally formed with a vertical wall 23 the upper end of which is bent angularly to provide a horizontal tab 24 projecting over the trough of member 22.

The member 22 accommodates an object such as golf stick 25, the vertical wall 23 acting as an abutment to fix the position of one end of the object relative to fulcrum of the base lever 16. The upper tab 24 holds the object down and prevents it from tilting on the right hand end of the trough and thus falling out of member 22. The object is in this manner securely retained in definite position on the bar 19 which is rigid with lever 16 and becomes in effect a freely removable part of the lever. This removable part of the lever constituted by the object has its weight distributed on opposite sides of the fulcrum of the base lever. Accordingly, of two objects, a difference in total weight will not of itself affect the relative reading of pointer 12 on chart 11 but a variation in distribution of weight of the objects relative to the fulcrum point of the lever will cause a movement of the pointer. All the objects whose weights are similarly distributed to either side of the fulcrum of the base lever will bring the pointer 12 to the same point of the chart. These objects are said to be matched and the point on the chart may be termed the "match" point. Any object whose weight is not similarly distributed will move the pointer away from the "match" point and the direction in which the pointer moves indicates which side of the object is below the weight required of the correctly matched object of the same weight.

While there has been shown and described and pointed out the fundamental novel features of the invention as applied to a single modification, it will be understood that various omissions and substitutions and changes in the form and details of the devices illustrated and in its operation may be made by those skilled in the art without departing from the spirit of the invention. It is the intention therefore to be limited only as indicated by the scope of the following claims.

I claim:

1. A scale comprising automatic counterbalancing and indicating means, a lever operating said means, and a device carried by said lever to hold an object, said device being trough-shaped to receive the object and hold it against lateral displacement, said device being provided with an end wall to abut the object and hold it in definite position relative to said lever, and a top abutment provided for the object in the holder to prevent displacement upwardly of the object.

2. A scale comprising weighing means and a lever device for operating said means, said device including a trough-shaped one piece sheet metal holder for an object, the holder being integrally formed with an end wall and a projection extending angularly from said wall longitudinally of and above the trough.

3. A device comprising automatic counterbalancing and indicating means, a lever for operating said means, and a member rigidly carried by said lever and extending longitudinally thereof to both sides of the lever fulcrum for supporting an object as a removable part of the lever to affect the automatic counterbalancing and indicating means.

4. A scale comprising automatic counterbalancing and indicating means, a lever for operating said means, a bar spaced away from the lever, supported thereby, and extending parallel thereto, and a member for freely removably supporting an object having walls extending parallel to the bar and rigidly carried by the outer side of the bar.

In testimony whereof I hereto affix my signature.

WILLIAM GUMPRICH.